United States Patent [19]

Edstrom

[11]  4,258,666
[45]  Mar. 31, 1981

[54] ADJUSTABLE ANIMAL WATERING OR DRINKING DEVICE

[76] Inventor: William E. Edstrom, 28324 E. Main, Waterford, Wis. 53185

[21] Appl. No.: 19,881

[22] Filed: Mar. 12, 1979

[51] Int. Cl.³ .......................... A01K 7/00; F16K 7/12; F16K 31/00
[52] U.S. Cl. .................................. 119/72.5; 119/75; 137/614.11; 251/339
[58] Field of Search ................... 119/72.5, 75; 137/614.11, 614.18; 251/339

[56] References Cited

U.S. PATENT DOCUMENTS

| | | | |
|---|---|---|---|
| 3,498,269 | 3/1970 | Taschitzki | 119/75 |
| 3,513,811 | 5/1970 | Graham | 119/72.5 |
| 3,550,560 | 12/1970 | Edstrom | 119/72.5 |
| 3,698,431 | 10/1972 | Thompson | 251/339 |
| 3,750,706 | 8/1973 | Mallinson | 119/72.5 |
| 4,133,345 | 1/1979 | Mitchell | 251/339 |

Primary Examiner—William F. Smith
Assistant Examiner—Steve Alvo
Attorney, Agent, or Firm—Thomas F. Kirby

[57] ABSTRACT

A watering or drinking device for small animals includes a drinking valve member actuatable by the animal, an adjustable flow control valve member responsive to actuation of the drinking valve member to limit maximum flow from the device, and a mechanism for adjusting the position of the flow control valve member to fully closed, partially open, or fully open positions. The device includes upper and lower threadedly interconnected hollow fittings having a resilient, compressible apertured diaphragm entrapped in a space therebetween. The upper and lower fittings include upper and lower valve seats, respectively, cooperating with the upper and lower valve members, respectively and the lower valve member has an actuator stem extending downwardly through the hollow lower fitting. The diaphragm supports the cone-shaped upper flow control valve member in a predetermined position relative to the cone-shaped upper valve seat and also exerts pressure on the disc-shaped lower drinking valve member to seat the latter on the lower valve seat. Lateral pivotal movement or axial inward movement of the stem by the animal unseats (opens) the lower drinking valve member, thereby deflecting the diaphragm upward and causing upward movement of the upper flow control valve member to partially open (flow limiting) position. Upon release of the stem, diaphragm tension causes reseating of the lower drinking valve member and return of the upper control valve member to its original position. Relative rotation of the fittings adjusts bulging of the entrapped diaphragm and thus determines the setting or position of the upper flow control valve member.

13 Claims, 5 Drawing Figures

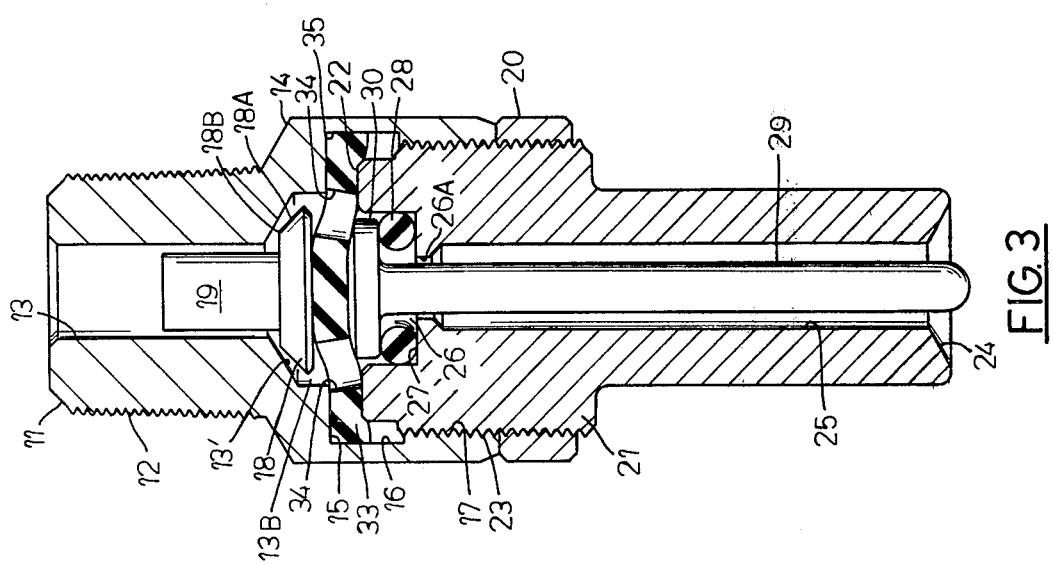
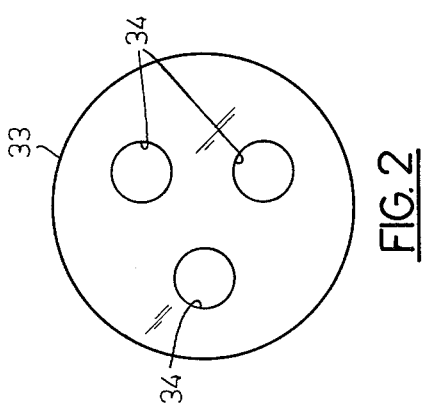
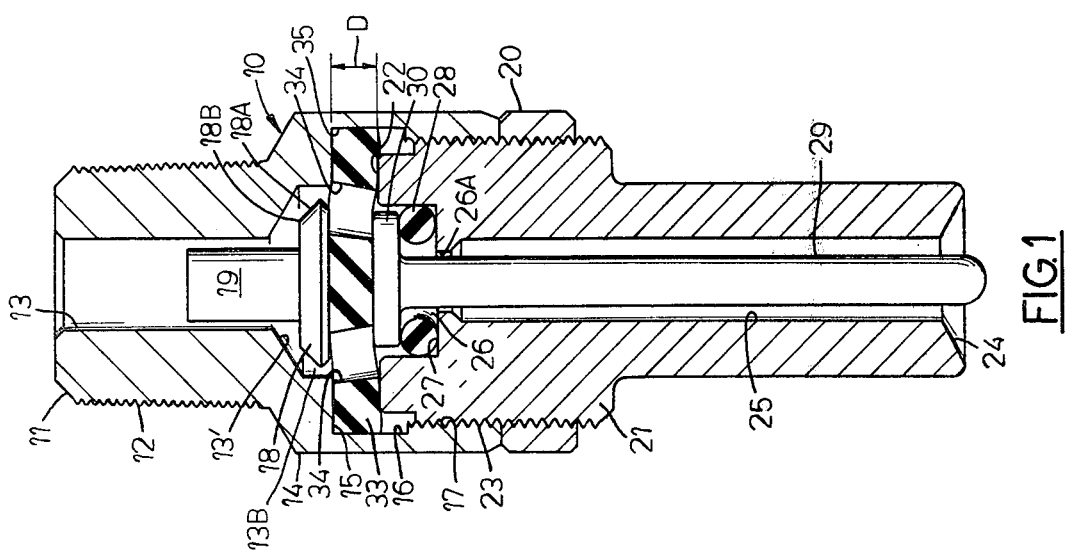

ADJUSTABLE ANIMAL WATERING OR DRINKING DEVICE

TECHNICAL FIELD

The present invention relates generally to adjustable watering or drinking devices for animals, especially small laboratory animals, or those raised commercially, including, for example, rodents, such as mice and rats, mink, chinchillas, guinea pigs, rabbits, poultry or other fowl.

DESCRIPTION OF THE PRIOR ART

The prior art contains a wide variety of watering or drinking devices for supplying drinking water to the above-identified animals. U.S. Pat. No. 3,550,560 for "Animal Drinking Devices," issued Dec. 29, 1970 to William E. Edstrom, the present applicant, discloses an animal watering or drinking device which includes an upper fitting and a tubular lower fitting with a resilient, apertured diaphragm entrapped in a space therebetween. The diaphragm pressurably bears on the top surface of a drinking valve member or head having a downwardly-extending valve stem which is adapted to be pivoted laterally by an animal to cause the valve head to cant on a resilient valve seat and simultaneously deflect the apertured diaphragm to allow water to flow therethrough and downwardly around the canted valve head through the tubular lower fitting to the animal. The tension created by the resilient diaphragm causes the valve head to resume its sealing engagement with the resilient valve seat upon release of the stem by the animal.

In practice, such devices are installed in manifolds with the tip of the tubular lower fitting protruding into the animal cage or located just outside the cage with the animal drinking through a hole in the cage. The latter arrangement is utilized when the cages have a solid bottom with bedding of wood chips, ground corn cob, etc., to avoid water spillage inside the cage. A trough is usually located under the watering device to collect spillage when the animal drinks. Water is supplied to the valve manifold at a low pressure, generally about 3 PSIG. The watering device must be very easy to operate because an animal as small as a 13 gram weanling mouse, for example, must be able to actuate it. Spillage of water can occur because most adult animals actuate the device by applying either lateral or axial pressure to the end of the valve stem with their lower front teeth and thus open the drinking valve in the device all the way, which allows a full flow of water. Because there is more water flowing than the animal can drink, spillage occurs. This results in wet bedding in the cage or water filling the drip trough outside the cage and spilling onto the floor, causing unsanitary conditions as well as an unsafe work place for the caretaker. It also wastes water.

SUMMARY OF THE INVENTION

In accordance with the present invention, there is provided a watering or drinking device for small animals which includes a drinking valve member actuatable by the animal, an adjustable flow control valve member responsive to actuation of the drinking valve to limit maximum flow from the device, and means for adjusting the position of the flow control valve member to fully closed, partially open, or fully open positions. The device includes upper and lower threadedly interconnected hollow fittings having a resilient, compressible apertured diaphragm entrapped in a space therebetween. The upper and lower fittings include upper and lower valve seats, respectively, cooperating with the upper and lower valve members, respectively, and the lower valve member has an actuator stem extending downwardly through the hollow lower fitting. The diaphragm supports the upper flow control valve member in a predetermined position relative to the upper valve seat and also exerts pressure on the lower drinking valve member to seat the latter on the lower valve seat. Lateral pivotal movement or axial inward movement of the stem by the animal unseats or opens the lower drinking valve member, thereby deflecting the diaphragm upward and causing upward movement of the upper flow control valve member to partially open or flow limiting position. Upon release of the stem, diaphragm tension causes reseating of the lower drinking valve member and return of the upper control valve member to its original position.

Preferably, the upper valve member is independently movable relative to the diaphragm and includes a centering or positioning stem extending upwardly into the opening in the upper valve seat. The upper valve seat includes a conical valve seat surface and the upper valve member includes a peripheral edge engageable therewith. Preferably, the upper valve member includes a conical surface which terminates in said peripheral edge, said conical surface being engagable with said conical surface of said upper valve seat.

Means are provided to adjustably position the upper valve member relative to the upper valve seat and thereby regulate the clearance between the upper valve member and the upper valve seat to thereby control water flow from said device.

More specifically, means are provided to adjustably position the resilient diaphragm (causing it to bulge) relative to the upper portion of the device to thereby regulate the position of the upper valve member resting thereon. Such means include interengaging screw threads on the upper and lower portions of the device whereby, upon relative rotation of the upper and lower fittings, the spacing between said portions can be changed and the diaphragm interposed between said portions is caused to change position or bulge in response thereto.

The position of the upper valve member relative to the upper valve seat can be adjusted to regulate water flow between fully closed, and partially open, and fully open positions by adjustably compressing the diaphragm between the upper and lower fittings thereby causing the diaphragm to bulge and thereby locate the upper valve member in a predetermined position. Adjustable compression of the diaphragm is achieved by screwing the threadedly interengaged upper and lower fittings of the device closer together or farther apart.

A watering device in accordance with the invention offers several advantages over the prior art. For example, the upper valve member serves as a flow control device which puts a maximum limit on the amount of water that can flow through the device when the lower valve member is fully opened. Furthermore, the flow control valve can be adjusted between a fully closed and partially open or fully open positions. The fully closed position is desirable to isolate watering devices in a system which are not in use. Furthermore, the maximum flow rate can be adjusted to suit the drinking capacity of a particular animal being serviced by a particular device. Furthermore, a drinking device in accordance with the invention functions to regulate, limit, or control maximum flow whether the animal deflects the valve stem laterally or whether the animal pushes the valve stem axially inwardly as with its teeth. Also, since the upper valve member is unattached to the resilient diaphragm and is free to move independently thereof within its design limits, the upper valve member or cone tends to be self-cleaning and tends to maintain the upper valve seat clean in that buildup of mineral deposits on these components is prevented.

A further advantage of the present invention is that the adjustable flow self-watering drinking device is simple and economical in design, construction, and operation, such device being constructed of readily available standard parts, thereby providing a unit which can be manufactured for substantially less cost than the self-watering devices heretofore available.

Still further objects of the present invention are to provide an animal-watering device which is rugged and durable in construction, requires a minimum of care and maintenance, and is otherwise particularly well adapted for its intended purposes.

BRIEF DESCRIPTION OF THE DRAWING

In the accompanying drawing, wherein there is illustrated one complete embodiment of a preferred form of the invention, and wherein the same reference numerals designate the same parts in all of the views:

FIG. 1 is a vertical cross-sectional view of an animal-watering device in accordance with the invention showing the valve head in closed position and the adjustable flow cone in fully unthrottled position;

FIG. 2 is a plan view of the sealing diaphragm shown in FIG. 1;

FIG. 3 is a cross-sectional view similar to FIG. 1 showing the valve head in closed position and the adjustable flow cone in partial throttling position;

DESCRIPTION OF THE PREFERRED EMBODIMENT

Figure 5:
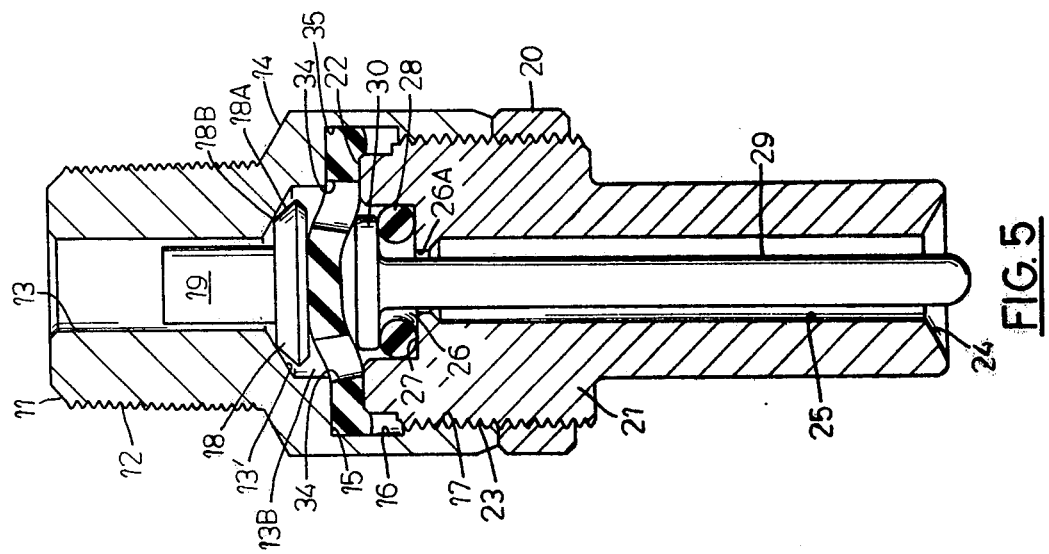
FIG. 5 is a cross-sectional view similar to FIG. 1 showing the valve head in closed position and the adjustable flow cone in fully throttled or shut-off position.
Figure 4:
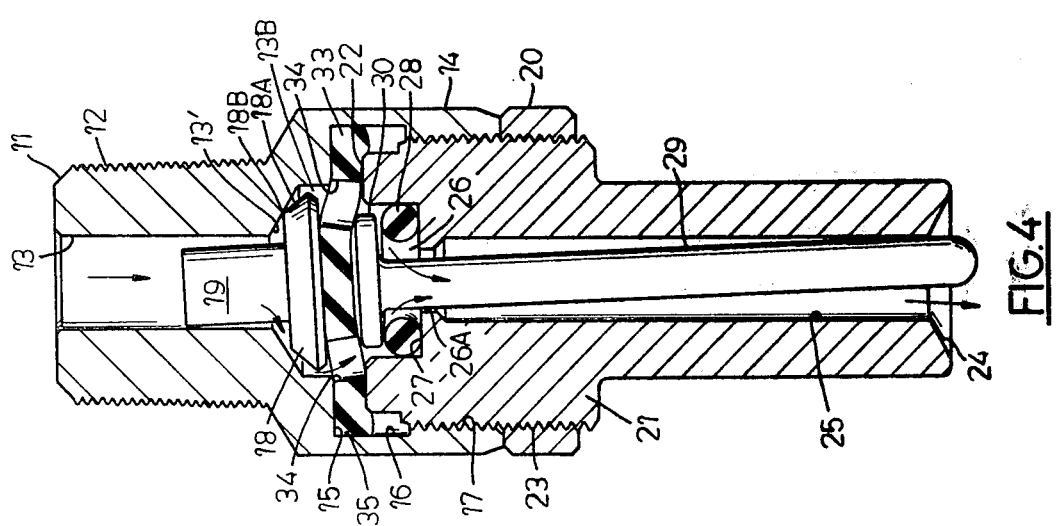
FIG. 4 is a cross-sectional view similar to FIG. 3 showing the valve head in open position and the adjustable flow cone in partial throttling position.

Referring to FIG. 1, there is shown a watering or drinking device for small animals which includes a drinking valve member 30 actuatable by the animal, an adjustable fluid flow control valve member 18 responsive to actuation of the drinking valve member 30 to limit maximum flow from the device, and means for adjusting the position of the flow control valve member 18 to fully closed, partially open, or fully open positions. The device includes upper and lower threadedly interconnected hollow fittings 10 and 21, respectively, having a resilient, compressible apertured diaphragm 33 entrapped in a space 35 therebetween. The upper and lower fittings 10 and 21, respectively, include upper and lower valve seats 13' and 28, respectively, cooperating with the upper and lower valve members 18 and 30, respectively and the lower valve member 30 has an actuator stem 29 extending downwardly through the passage 25 in the hollow lower fitting 21. As FIGS. 1, 3, and 5 show, the diaphragm 33 supports the upper flow control valve member 18 in a predetermined position relative to the upper valve seat 13' and also exerts pressure on the lower drinking valve member 30 to seat the latter on the lower valve seat 28. As FIG. 4 shows, lateral pivotal movement or axial inward movement of the stem 29 by the animal unseats (opens) the lower drinking valve member 30, thereby deflecting the diaphragm 33 upward and causing upward movement of the upper flow control valve member 18 to partially open (flow limiting) position. Upon release of the stem 29, diaphragm 33 tension causes reseating of the lower drinking valve member 30 and return of the upper control valve member 18 to its original position. Relative rotation of the fittings 10 and 21 adjusts bulging of the diaphragm 33 entrapped in space 35 and thus determines the setting or position of the upper flow control valve member.

Tubular upper portion, fitting or valve cap 10 has an upright portion 11 which a bore 13 extending therethrough, and a plurality of external threads 12 are formed on and around the exterior of upright portion 11. In use, the tubular portion 11 is screwed into an internally threaded manifold leading from a suitable supply of drinking water, and the threads 12 function to securely maintain a tight, leakproof engagement thereon. The lower end of valve cap 10 includes an enlarged base portion 14 within which the bore 13 is enlarged and flared outwardly and downwardly to define a cylindrical cavity 13B and a conical surface 13', the function of which surface is to provide an upper valve seat for flow adjustable upper valve member or cone 18. Cone 18, which rests upon and is unattached and independently movable relative to resilient diaphragm 33, includes a stem 19 extending upwardly into bore 13 through the opening in the valve seat 13'. Stem 19 serves to generally center cone 18 relative to bore 13. Cone 18 is disposed in cylindrical cavity 13B and includes a conical surface 18A which terminates in a peripheral edge 18B. Edge 18B of cone 18 is engagable with conical upper valve seat surface 13', and conical surface 18A of cone 18 is also engagable with the conical surface 13' under certain conditions, as hereinafter explained. Cavity 13B communicates with a still larger bore 16 opening in the bottom of valve cap 10 and the lower portion of bore 16 has internal threading 17 formed therein. An annular, downwardly-facing internal shoulder 15 is formed on valve cap 10 between the communicating bore 13B and 16. Preferably, the interior shoulders, corners, and edges in the present device are rounded slightly to eliminate sharp edges which might cut or damage the resilient members 33 and 28, as will be seen, although this is not a critical feature of the invention.

The lower tubular portion, member, or fitting 21 is threaded into valve cap 10 and has external threading 23 and a flat upper end face 22 which is located below the aforementioned internal shoulder 15 formed in the interior of valve cap 10 to define a space 35 when the lower member is inserted therein. An internally threaded lock ring 20 is provided on the external threading 23 of fitting 21 below cap 10. The lower end 24 of tubular member 21 is inwardly beveled, as shown, and formed in and through said member is a vertical bore 25. The upper end 26 of bore 25 is restricted as at 26A and then enlarged, thereby forming an internal, upwardly-facing annular shoulder 27, and bore 26 opens in the top of member 21 in registration with the bore portion 13B of the valve cap 10 thereabove, the latter bore 13B being of somewhat larger diameter than the lower member bore 26. Seated on annular shoulder 27 and closely fitted within bore portion 26 of member 21 is a resilient O-ring 28 formed of rubber or rubber-like material, the function of which is to provide a resilient lower valve seat as will be hereinafter seen.

Mounted within bore 25 in lower fitting 21 is an elongated stem 29 which extends downwardly from lower valve member 30, as shown. Lower valve member 30 takes the form of an enlarged, flat circular head or member which normally seats in flat, sealing engagement on the aforementioned resilient O-ring 28, as illustrated in FIG. 1. Lower valve member 30 is of smaller diameter than the enlarged bore portion 26, thereby providing an annular space for water flow therebetween.

Clampingly retained in the space 35 between top surface 22 of lower fitting 21 and the annular shoulder 15 of upper fitting 10 thereabove is a circular resilient compressible diaphragm 33 which is of a diameter to closely fit within the bore 16. Diaphragm 33 includes a plurality of spaced apertures 34 therethrough (FIG. 2) which are so located as to normally be positioned immediately adjacent the inner edge of the top surface 22 of lower fitting 21 and above bore 26, as illustrated in FIG. 1. Resilient diaphragm 33 is adapted to be stretched and deflected in response to tilting movement of the valve head 30 during the operation of the watering device to allow water to pass therethrough, as will hereinafter be described, as well as functioning as a strainer to prevent large foreign particles from becoming lodged between valve head 30 and O-ring seat 28 and causing leakage therebetween.

The valve stem 29 and valve head 30 are not only tiltable but are also shiftable axially inwardly in response to engagement of the lower end portion of stem 29 by the teeth of an animal to cause the valve head 30 to press against the resilient diaphragm 33 and to thereby move the upper valve member 18 toward the upper valve seat 13' and to thereby reduce clearance between the valve member 18 and the valve seat 13' to thereby control, restrict, or reduce water flow through the opening of the upper valve seat 13'. Valve member 18 is movable away from the valve seat 13' when the valve head 30 resumes its sealing position and the resilient diaphragm 33 moves toward its undeflected position, upon release of the valve stem 29 by the animal.

FIGS. 1, 3, 4, and 5 show the positions of the cone 18 to regulate water flow. The flow through the device is regulated by the location of the cone 18. Comparing FIGS. 1, 3, and 5, if lower member 21 is tightened relative to upper valve cap 10, the diaphragm 33, which is an elastomer, is compressed between surface 22 on member 21 and surface 15 on the valve cap 10. Since the rubber-like material of diaphragm 33 acts like a fluid under compression, it will flow. Therefore, the bulk of diaphragm material displaced will flow into the cylindrical cavity 13B. This will cause the diaphragm to bulge as shown in FIGS. 3 and 5 forming a portion of a sphere. The height of this bulge is proportional to the amount of diaphragm compression between surfaces 22 and 15. In FIG. 5, the upper valve member 18 is adjusted to fully closed position so that the flow therepast would be zero if the tip of valve stem 29 were moved axially or inwardly. This is accomplished because the edge 18B of the cone 18 is in full peripheral contact with the conical seating surface 13" in valve cap 10, regardless of the position of stem 29. FIG. 3 is a cross section of the device showing the cone 18 adjusted to partially open position to throttle the flow. FIG. 4 shows the drinking valve head 30 tilted to the open position with the tip of stem 29 moved axially to its extreme position. Locking ring 20 is tightened once the flow is adjusted to a desired position to ensure that the adjustment is maintained. Since the cone 18 is not attached to the diaphragm 33, it floats and tilts as shown when the stem 29 tip is moved. The movement of the cone 18 will prevent build up of minerals from the water, thus reducing the chance of plugging when the device is adjusted for very low flow.

In the use of the present invention, drinking water from a tank, reservoir, or other suitable source ordinarily located from one to ten feet above the drinking device is supplied to the valve cap 10 by means of a suitable connecting hose or the like (not shown) mounted thereon. The diaphragm 33, which is clampingly retained between the shoulders 15 and 22, prevents water from flowing downwardly between said threaded interfitting upper and lower fittings 10, 21.

Drinking units of the present type are generally used where the animals are housed in individual cages, there being a unit clipped onto each of the cages and all of said drinking devices being supplied from the same tank or reservoir. Preferably, the drinking unit will be clipped onto the cage in a position whereby only the bottom portion of the lower fitting, and the downwardly-extending valve stem, project into the cage.

With reference to FIG. 4 of the drawing, when an animal wishes to obtain a drink of water, it has merely to bite against the lower end of the valve stem 29, and the lateral pressure thus applied to the valve stem causes the stem to pivot sideways within the limits prescribed by the diameter of the bore 25, as illustrated, thereby canting or tilting the valve head 30 against the tension of the resilient diaphragm 33 (and the water pressure thereon). The canting of valve head 30 is promoted by the resilient nature of the O-ring valve seat 28, and as the valve head assumes an angled position, clearance is provided between the side of the O-ring opposite the pivot point and the underside of the valve head. Thus, as indicated by the directional arrows in FIG. 4, the water in upper member 10 is able to flow downwardly past cone 18 and through one or more of diaphragm apertures 34, around and downwardly past the canted valve head 30, through the central opening in said O-ring 28, and downwardly through the vertical bore 25 in the lower fitting 21 to the mouth of the animal. In some cases, the animal pushes the valve stem 29 axially inwardly thereby fully unseating valve member 30. In such cases, the diaphragm 33 moves upwardly and causes corresponding upward movement of cone 18 toward valve seat 13' thereby causing partial or full throttling of water flow.

When the animal has quenched its thirst and releases the valve stem 29 the resiliency of the diaphragm 33, together with the water pressure thereabove, returns said valve head to its original, sealing position on the valve seat, as FIG. 3 shows, thereby preventing further flow of water through the valve and eliminating waste, and cone 18 returns to the position shown in FIG. 3.

In the event the water pressure in the system should be greater than normal, the compression on the resilient valve seat 28 is correspondingly increased, and, when the valve stem 29 is moved to open the valve, the increased springback tendency or expansion of the O-ring 28 on the side opposite the pivot point reduces the size of the opening through which the water can flow. Thus, a relatively constant flow volume is obtained, subject to the positioning of cone 18, regardless of the water pressure in the system. This is in contrast to most conventional self-watering devices wherein an opening or passageway of constant size is provided and wherein an increase in water pressure produces a corresponding increase in the flow rate.

The diaphragm 33 maintains considerable pressure on the resilient valve components to provide tight engagement therebetween regardless of the water pressure in the system and only particles or stones of substantial size can affect the leakproof seal thus provided, thereby minimizing the possibility of leakage or dripping. Furthermore, the independently movable cone 18 also inhibits mineral buildup.

It is to be understood that while one preferred embodiment of the present invention has been illustrated and described herein, numerous variations or modifications therein may occur to those having skill in this art and what is intended to be covered herein is not only the illustrated form of the invention, but also any and all modified forms thereof as may come within the spirit of said invention.

I claim:

1. An adjustable flow watering device for animals, comprising:
    a housing having a passage therein communicating with a downwardly extending tubular member having an open lower end;
    a resilient deflectable apertured diaphragm mounted in said passage;
    upper and lower valve seats located above and below said diaphragm, respectively, each valve seat having an opening therethrough;
    upper and lower valve members engageable with said upper and lower valve seats, respectively, and engageable by said diaphragm; and
    an elongated valve stem extending downwardly from said lower valve member through said tubular member to a point adjacent the lower end thereof;
    said diaphragm operating when undeflected to maintain said lower valve member seated in sealing engagement with said lower valve seat and to locate said upper valve member in an open position relative to said upper valve seat;
    said valve stem being movable in response to engagement of its lower end by an animal to cause said lower valve member to be unseated to thereby permit water flow through said passage and out said open lower end, and to cause said lower valve member to move said diaphragm to thereby effect movement of said upper valve member toward said upper valve seat and thereby limit the water flow through the opening in said upper valve seat;
    the tension of said diaphragm causing said upper valve member to resume its said open position and causing said lower valve member to resume its said sealing engagement with said lower valve seat upon release of said valve stem by the animal to thereby halt the flow of water.

2. An adjustable flow watering device according to claim 1 including means to adjustably position said upper valve member relative to said upper valve seat and thereby regulate the clearance therebetween to thereby control the water flow through the opening in said upper valve seat.

3. An adjustable flow watering device according to claim 2 wherein said means includes means to deform said resilient diaphragm to thereby change said predetermined position of said upper valve member relative to said upper valve seat.

4. An adjustable flow watering device according to claim 3 wherein said means to deform said resilient diaphragm includes means to adjustably compress one portion of said diaphragm to cause another portion thereof engageable with said upper valve member to bulge.

5. An adjustable flow watering device according to claim 1 wherein said upper valve seat includes a conical surface and wherein said upper valve member includes a peripheral edge engagable with said conical surface.

6. An adjustable flow watering device according to claim 5 wherein said upper valve member includes a conical surface which terminates in said peripheral edge, said conical surface of said upper valve member being engagable with said conical surface of said upper valve seat.

7. An adjustable flow watering device according to claim 1 wherein said upper valve member is independently movable relative to said diaphragm.

8. An adjustable flow watering device according to claim 7 wherein said upper valve member includes a stem extending upwardly into said opening in said upper valve seat.

9. An adjustable flow watering device for animals, comprising:
    an upper portion having a passage therein;
    a lower portion including a downwardly extending tubular member communicating with said passage and having an open lower end;
    a resilient deflectable apertured diaphragm interposed in a space between said upper and lower portions;
    said upper and lower portions being relatively movable relative to each other to change the size of said space wherein said resilient diaphragm is interposed,
    upper and lower valve seats located above and below said diaphragm, respectively, each valve seat having an opening therethrough;
    upper and lower valve members engageable with said upper and lower valve seats, respectively, and engageable by said diaphragm;
    an elongated valve stem extending downwardly from said lower valve member through said tubular member to a point adjacent the lower end thereof;
    said diaphragm operating when undeflected to maintain said lower valve member seated in sealing engagement with said lower valve seat and to locate said upper valve member in an open position relative to said upper valve seat;
    said valve stem being movable in response to engagement of its lower end by an animal to cause said lower valve member to be unseated to thereby permit water flow through said passage and out said open lower end, and to cause said lower valve member to move said diaphragm to thereby effect movement of said upper valve member toward said upper valve seat and thereby limit the water flow through the opening in said upper valve seat;
    the tension of said diaphragm causing said upper valve member to resume its said open position and causing said lower valve member to resume its said sealing engagement with said lower valve seat upon release of said valve stem by the animal to thereby halt the flow of water; and means to adjustably position said upper valve member relative to said upper valve seat and thereby regulate the clearance therebetween to thereby control the water flow through the opening in the upper valve seat, said means including means to move said upper and lower portions to adjustably compress one portion of said diaphragm in said space to cause another portion thereof engageable with said upper valve member to deform and thereby change said predetermined position of said upper valve member relative to said upper valve seat.

10. An adjustable flow watering device according to claim 9 wherein said upper valve seat includes a conical surface and wherein said upper valve member includes a peripheral edge engagable with said conical surface.

11. An adjustable flow watering device according to claim 10 wherein said upper valve member includes a conical surface which terminates in said peripheral edge, said conical surface of said upper valve member being engagable with said conical surface of said upper valve seat.

12. An adjustable flow watering device according to claim 9 wherein said upper valve member is independently movable relative to said diaphragm.

13. An adjustable flow watering device according to claim 12 wherein said upper valve member includes a stem extending upwardly into said opening in said upper valve seat.

* * * * *